(12) United States Patent
Yasaki et al.

(10) Patent No.: US 9,734,310 B2
(45) Date of Patent: Aug. 15, 2017

(54) AUTHENTICATION METHOD AND COMPUTER-READABLE RECORDING MEDIUM

(71) Applicant: FUJITSU LIMITED, Kawasaki-shi, Kanagawa (JP)

(72) Inventors: Koichi Yasaki, Kawasaki (JP); Kazuaki Nimura, Kawasaki (JP); Hidenobu Ito, Kawasaki (JP); Yosuke Nakamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/598,618

(22) Filed: Jan. 16, 2015

(65) Prior Publication Data

US 2015/0128217 A1    May 7, 2015

Related U.S. Application Data

(63) Continuation of application No. PCT/JP2012/071203, filed on Aug. 22, 2012.

(51) Int. Cl.
    G06F 21/31    (2013.01)
    G06F 21/32    (2013.01)
    H04L 29/06    (2006.01)

(52) U.S. Cl.
    CPC .............. *G06F 21/31* (2013.01); *G06F 21/32* (2013.01); *H04L 63/00* (2013.01); *G06F 2221/2101* (2013.01); *H04L 63/08* (2013.01)

(58) Field of Classification Search
    CPC ......... G06F 21/31; G06F 21/32; H04L 63/00; H04L 63/08

(Continued)

(56) References Cited

U.S. PATENT DOCUMENTS 6,515,575 B1    2/2003  Kataoka
2003/0014673 A1*  1/2003  Baum .............. G07B 17/00193
                                                            726/26

(Continued)

FOREIGN PATENT DOCUMENTS

JP    11-355267    12/1999
JP    2000-3336    1/2000

(Continued)

OTHER PUBLICATIONS

"Fujitsu Develops Information Device Technology to Automatically Deliver and Run Applications Needed at a Particular Time and Place", *Fujitsu Press Release*, Jul. 19, 2011, 3 pp., Fujitsu Laboratories Ltd.

(Continued)

*Primary Examiner* — Matthew Henning
(74) *Attorney, Agent, or Firm* — Staas & Halsey LLP (57) ABSTRACT

To enhance the convenience of authentication when executing an application, an application server: acquires, from a terminal, context information indicating the status of the terminal; generates, on the basis of the acquired context information, information (an authentication necessity table) pertaining to the necessity for authentication when executing the application; and transmits to the terminal the authentication necessity table and an authentication module described in the table. Then, the terminal, on the basis of the authentication necessity table and an authentication table, determines whether or not authentication is necessary before executing the application, and when it has been determined that authentication is necessary, prior to executing the application, changes the authentication module read destination to the application read destination and executes the authentication module.

10 Claims, 9 Drawing Sheets

(58) Field of Classification Search
USPC .................................................................. 726/3
See application file for complete search history.

(56) References Cited

U.S. PATENT DOCUMENTS

| | | | |
|---|---|---|---|
| 2003/0158815 A1 | 8/2003 | Yoshida et al. | |
| 2004/0104265 A1 | 6/2004 | Okada et al. | |
| 2005/0229240 A1 | 10/2005 | Nanba | |
| 2006/0168252 A1 | 7/2006 | Urano et al. | |
| 2007/0005988 A1* | 1/2007 | Zhang .................... | G06F 21/32 713/186 |
| 2007/0050632 A1 | 3/2007 | Matsuoka et al. | |
| 2007/0217764 A1 | 9/2007 | Asagi et al. | |
| 2010/0107222 A1* | 4/2010 | Glasser ............... | G06F 21/6245 726/3 |
| 2011/0225625 A1* | 9/2011 | Wolfson .................. | H04L 63/08 726/1 |

FOREIGN PATENT DOCUMENTS

| | | |
|---|---|---|
| JP | 2001-67332 | 3/2001 |
| JP | 2003-186836 | 7/2003 |
| JP | 2003-196566 | 7/2003 |
| JP | 2004-86657 | 3/2004 |
| JP | 2004-178408 | 6/2004 |
| JP | 2005-301500 | 10/2005 |
| JP | 2007-58420 | 3/2007 |
| JP | 2007-241852 | 9/2007 |
| JP | 2009-223502 | 10/2009 |
| JP | 2011-65387 | 3/2011 |
| WO | WO 2007/066480 A1 | 6/2007 |

OTHER PUBLICATIONS

International Search Report mailed Nov. 27, 2012, in corresponding International Patent Application No. PCT/JP2012/071203.
Written Opinion of the International Search Authority mailed Nov. 27, 2012, in corresponding International Patent Application No. PCT/JP2012/071203.
Japanese Office Action dated Apr. 12, 2016 in corresponding Japanese Patent Application No. 2014-531424.

* cited by examiner

<Authentication Table>

|  | Status | Correct Value |
|---|---|---|
| Terminal | Unlocked PIN 3 minutes before | PIN |
| Authen-tication 1 | — | %&su |

FIG. 4(b)

<Authentication Necessity Table>

| AppID | Lifetime | Unlock | Position 1 | Position 2 | ... |
|---|---|---|---|---|---|
| 1 | 2012/08/05 12:00 | Less than 5 minutes | Authentication 1 | Authentication 1 / Monitor 1 | ... |

FIG. 5

Risk based on place is high

Position 1

| | Possibility of the person himself/herself | | | Possibility of the person himself/herself | |
|---|---|---|---|---|---|
| | High | | | Low | |
| High | No authentication | Authentication 2 | High | No authentication | Authentication 1 |

Risk of leakage is high — Risk of leakage is low

Degree of urgency of task: Low → High

Position 2

| | Possibility of the person himself/herself | | | Possibility of the person himself/herself | |
|---|---|---|---|---|---|
| | High | | | Low | |
| High | No authentication | Authentication 2 | High | No authentication | Authentication 1 |
| | | | | | Monitor 1 |

Risk of leakage is high — Risk of leakage is low

Degree of urgency of task: Low → High

Risk based on place is low

AUTHENTICATION METHOD AND COMPUTER-READABLE RECORDING MEDIUM

CROSS-REFERENCE TO RELATED APPLICATION

This application is a continuation application of International Application PCT/JP2012/071203 filed on Aug. 22, 2012 and designated the U.S., the entire contents of which are incorporated herein by reference.

TECHNICAL FIELD

The present case relates to an authentication method and an authentication program.

BACKGROUND ART

Smartphones that are mobile terminals having performance equivalent to that of personal computers are spreading. Due to enrichment of 3G/LTE (Long Term Evolution)/hotspot, an environment in which smartphones are always capable of making connections to networks is being improved.

Taking advantage of such an environment, recently, an art has been appearing in which an application is transmitted to a mobile terminal from an application server that delivers applications at a necessary timing and is executed in the mobile terminal (see Non-Patent Document 1, for example). By utilizing such an art (called application-push technique), for example, if a request for a work is issued by a subordinate, an application necessary for doing the work (authentication application) is delivered to the mobile terminal owned by an authenticator from a server, whereby the authenticator is capable of performing the authentication work on the mobile terminal.

PRIOR ART DOCUMENT

NON-PATENT DOCUMENT 1: Press Release "Development of Information Device Technology to Automatically Deliver and Run Applications Needed at Particular Time and Place", Jul. 19, 2011, Fujitsu Limited, [Searched on Aug. 7, 2012], Internet <http://pr.fujitsu.com/jp/news/2011/07/19-1.html>

Patent Documents

Patent Document 1: Japanese Laid-Open Patent Publication No. 2004-178408
Patent Document 2: Japanese Laid-Open Patent Publication No. 2003-186836
Patent Document 3: International Publication Pamphlet No. WO2007/066480
Patent Document 4: Japanese Laid-Open Patent Publication No. 2001-067332

However, when a work is done while using an application relating to the work delivered to a personal mobile terminal (called BYOD (Beyond Your Own Device)), the security of the mobile terminal is important. In this case, since the individual mobile terminals have various security levels, in order to ensure security levels equal to or higher than a certain constant level, the users are forced to keep a security policy prescribed by the company or the like. An example of the security policy may be defined such that "set PIN (Personal Identification Number) for unlocking equal to or larger than a predetermined number of characters". However, if the users are forced to keep such a security policy, the usability of the mobile terminals may deteriorate.

Also, if an idea similar to DRM (Digital Rights Management) is introduced to the application push, there is a conceivable method for providing the applications with authentication modules suitable for the respectively applications. However, in use of the above method, since there is no cooperation between the terminals and the applications and between the applications, authentication should be performed each time the application is executed and the usability of the mobile terminals may deteriorate.

There are disclosed arts relating to authentication in Patent Documents 1 through 4.

SUMMARY

According to an aspect of the invention, there is provided an authentication method described in the present specification comprises: a step in which a server that provides a terminal device with an application acquires context information that indicates status of the terminal device from the terminal device; a step in which the server generates information about necessity for authentication on the basis of the context information acquired when executing the application; a step in which the server transmits the information about the necessity for authentication and an authentication module for executing authentication that is described as being needed in the information; a step in which the terminal device determines, before executing the application, whether the authentication is needed on the basis of the information about the necessity for authentication and history information about authentication performed in the past; and a step in which before executing the application, the terminal device changes a destination for reading the authentication module for executing the authentication that is determined as being needed by the step of determining to a destination for reading the application, and executes the authentication module.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 2($a$) is a diagram of a hardware structure of a terminal, and FIG. 2($b$) is a diagram of a hardware structure of an application server;

FIG. 4($a$) is a diagram indicating an authentication table, and FIG. 4($b$) is a diagram indicating an authentication necessity table;

DESCRIPTION OF EMBODIMENTS

Figure 1:
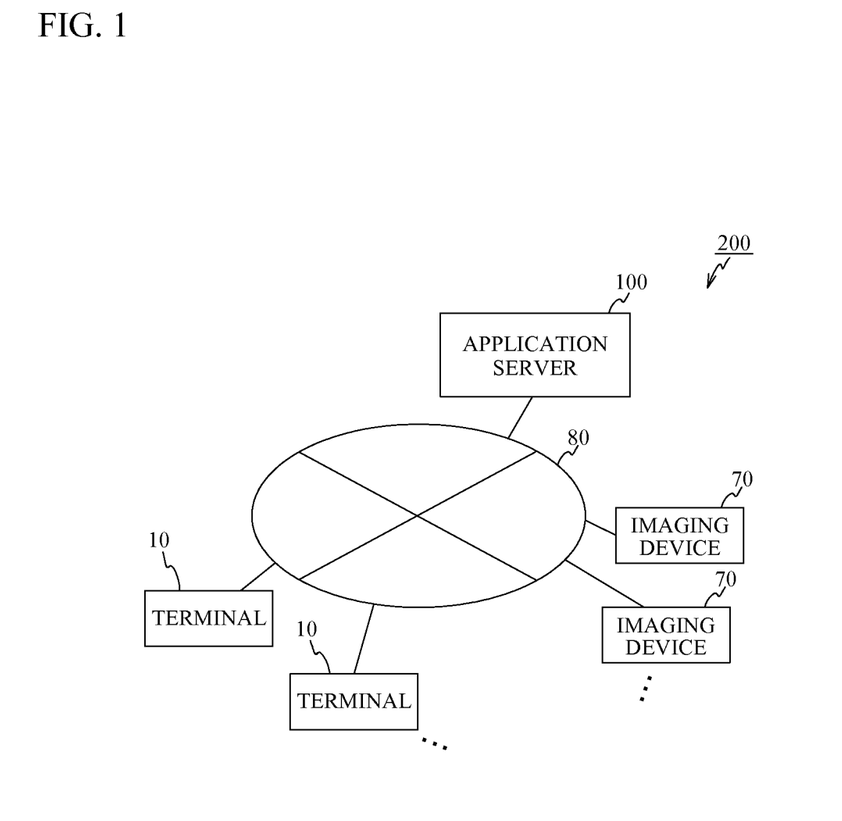
FIG. 1 is a schematic diagram of a structure of an information processing system in accordance with an embodiment.

A detailed description is now given, with reference to FIGS. 1 through 9, of an information processing system in accordance with an embodiment. In FIG. 1, there is schematically illustrated a structure of an information processing system 200 in accordance with an embodiment.

As illustrated in FIG. 1, the information processing system 200 is provided with a plurality of terminal devices (hereinafter referred to as "terminals") 10, an application server 100 as a server, and a plurality of imaging devices 70. The terminals 10, the application server 100 and the imaging devices 70 are connected to a network 80 such as Internet and 3G network.

The terminals 10 are information processing devices such as smartphones. For example, the terminals 10 are those personally owned by users who belong to a cooperate organization, and the users personally use the terminals, and further use those for work of the company (execution of an application delivered from the application server 100).

Figure 2A:
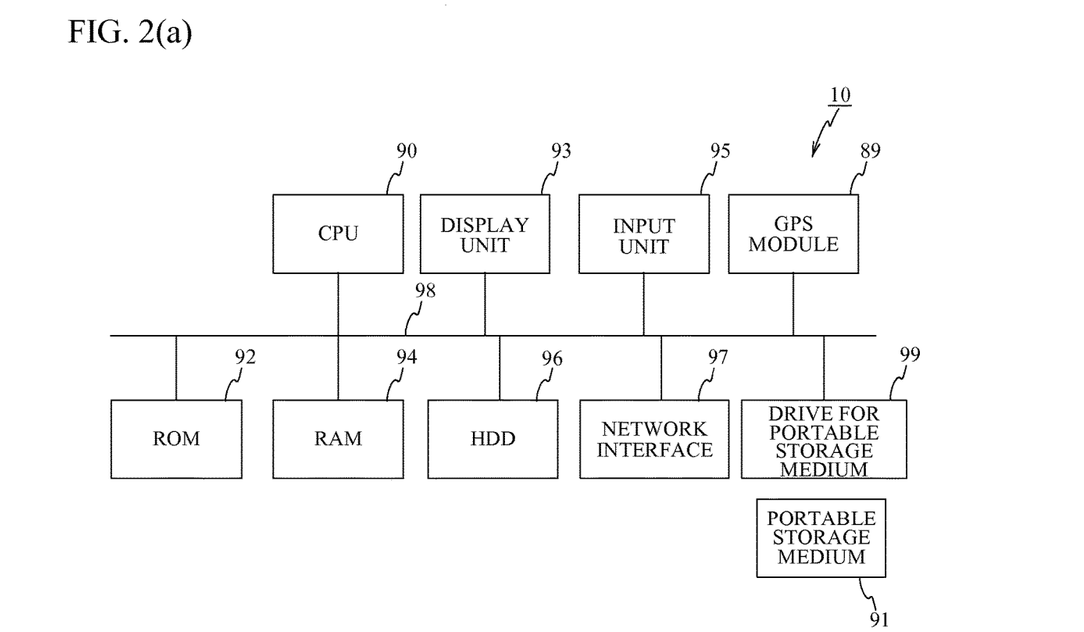

FIG. 2(a) illustrates a hardware structure of the terminals 10. As illustrated in FIG. 2(a), the terminal 10 is equipped with a CPU (Central Processing Unit) 90, a ROM (Read Only Memory) 92, a RAM (Random Access memory) 94, a storage unit (here HDD (Hard Disk Drive)) 96, a display unit 93, an input unit 95, a GPS (Global Positioning System) module 89, and a drive 99 for a portable storage medium. These parts of the terminal 10 are connected to a bus 98.

The display unit 93 is a liquid crystal display or an organic EL (Electro Luminescence) display. The input unit 95 is a keyboard, a touch panel, an input button and the like. The GPS module 89 detects the position of the terminal 10. In the terminal 10, functional units in FIG. 3 are realized in such a manner that the CPU 90 executes a program (authentication program) stored in the ROM 92 or HDD 96 or a program (authentication program) read from a portable storage medium 91 through the drive 99 for the portable storage medium.

Turning back to FIG. 1, the application server 100 analyzes work into minimal tasks (pieces of work that are to be executed by the user at a minimum) to form applications, and transmits the applications to the terminals 10. Further, the application server 100 performs a process relating to authentication that is performed when the applications are executed on the terminals 10.

Figure 2B:
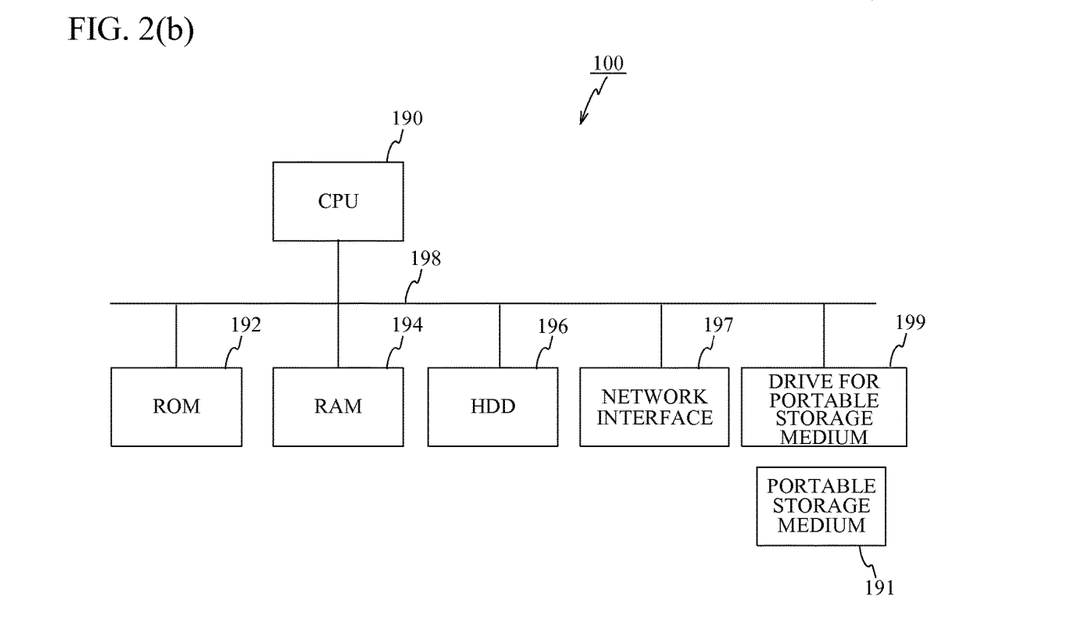

FIG. 2(b) illustrates a hardware structure of the application server 100. As illustrated in FIG. 2(b), the application server 100 is equipped with a CPU 190, a ROM 192, a RAM 194 and a storage unit (here HDD) 196, and a drive 199 for a portable storage medium, and these parts are connected to a bus 198. The application server 100 may also be provided with a display unit and an input unit like the terminals 10. In the application server 100, functional units in FIG. 3 are realized in such a manner that the CPU 190 executes a program stored in the ROM 192 or HDD 196 or a program read from a portable storage medium 191 through the drive 199 or the like for the portable storage medium.

Figure 3:
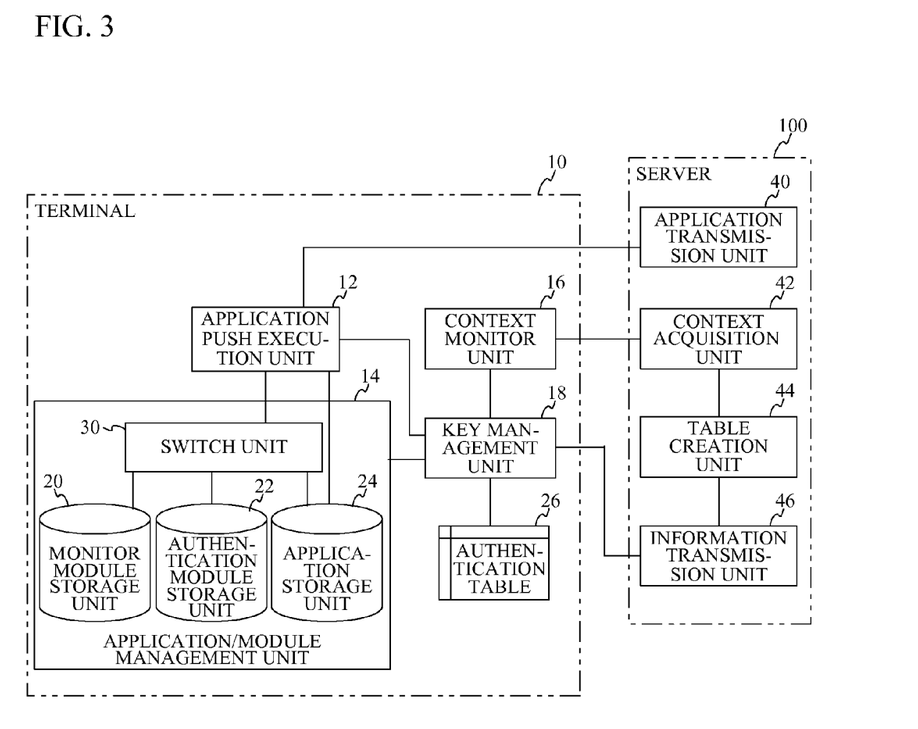
FIG. 3 is a function block diagram of the terminal and the application server.

In FIG. 3, there is illustrated a function block diagram of the terminals 10 and the application server 100. As illustrated in FIG. 3, the terminals 10 realize functions of an application push execution unit 12, an application/module management unit 14, a context monitor unit 16 and a key management unit 18 by executing the program by the CPU 90. Further, in FIG. 3, there are illustrated a monitor module storage unit 20, an authentication module storage unit 22, and an application storage unit 24, which are provided in the HDD 96 or the like.

The application push execution unit 12 executes not only an application delivered by the application server 100 but also an authentication module and a monitor module.

The application module management unit 14 holds the application, the authentication module and the monitor module delivered by the application server 100, and causes the application push execution unit 12 to execute the application and the modules that are to be executed by the application push execution unit 12. The application/module management unit 14 has a switch unit 30, the monitor module storage unit 20, the authentication module storage unit 22 and the application storage unit 24. The switch unit 30 changes the name (read destination) of the authentication module stored in the authentication module storage unit 22 and the name (read destination) of the monitor module stored in the monitor module storage unit 20 to the names (read destinations) of the applications stored in the application storage unit 24 (redirection), whereby the application push execution unit 12 is caused to automatically execute modules that are to be executed.

The context monitor unit 16 acquires context information that indicates the statuses of the terminals 10 (such as the results of position detecting by the GPS module 89 (FIG. 2(a)), and notifies the key management unit 18 of the same. Further, the context monitor unit 16 transmits the context information to a context acquisition unit 42 of the application server 100. The context information includes "a possibility that the person who is operating the terminal 10 is the person himself/herself" and "risk of leakage" of information from the terminal 10 as well as the results of position detecting by the GPS module 89 (the position of the terminal 10).

The "possibility of the person himself/herself" may be determined by using at least one of criteria of determination that is made by the context monitor unit 16, for example, by (1) determining whether the user authentication has been performed at the current place within a given period of time, (2) determining whether there is another terminal near here to which the same application is delivered (for example, a terminal owned by a user who belongs to the same section), and (3) determining whether there is a device (such as a wi-fi gadget) near here with a high probability that the device existed near the user in the past. As to the user authentication (1), the possibility of the person himself/herself may be determined by considering (A) whether the user authentication has been performed by using the terminal of concern, (B) whether there is another terminal near the terminal (such as an entering/leaving gate and a personal computer) on which the user authentication was performed, and the like.

As to the "risk of leakage" is determined by using one of criteria of determination that is made by the context monitor unit 16, for example, by (1) determining whether the terminal 10 is powered off, rebooted, or subjected to a configuration change after the user authentication is performed, (2) whether the terminal 10 is in a debug mode or performing a USB communication, (3) whether information indicating that the terminal 10 has been lost is raised from any terminal owned by the user. In the above case (3), it may be determined that the terminal 10 has been stolen or lost when a button is pressed by the user, the button being provided for use in "report of theft/loss of terminal 10" on a browser of a terminal (PC or the like) used by the user other than the terminal 10.

The risk of leakage may be determined on the basis of the content of the application. For example, a classification is performed so that an electronic mail is separated into an attached file and a body, an image is separated into a thumbnail and an enlarged image, and a document is separated into a black-painted document and the original, and management information is separated into intra-office information and client information, the risk of leakage may be determined on the respective degrees of importance.

The key management unit 18 acquired keys (Key) necessary to execute the application, the authentication module and the monitor module from the application server 100 and manages the same. Also, the key management unit 18 sends the keys (Key) managed to the application push execution unit 12.

Figure 4A:
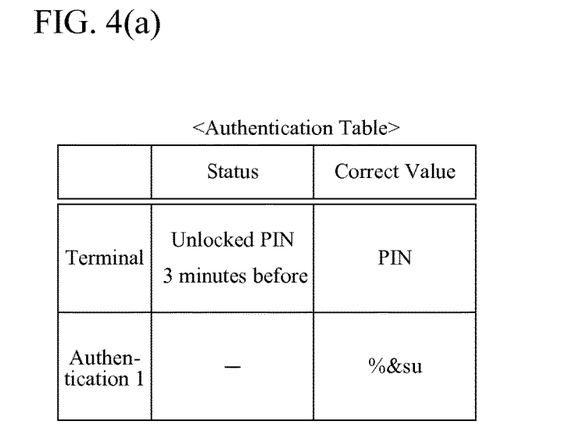

Further, the key management unit 18 manages information indicating what authentication was performed on the terminal 10 in the past (past authentication accumulation information) in the authentication table 26. In the authentication table 26, as illustrated in FIG. 4(*a*), for each authentication method, there are prepared fields of "status" that indicates history information of authentication performed in the past and "correct value" of the authentication. In the example of FIG. 4(*a*), a user authentication (unlocking) on the terminal 10 was performed three minutes before by using PIN, and information that the correct value of the present authentication is PIN is stored in. Further, in the example of FIG. 4(*a*), Authentication 1 has not yet been performed, and information indicating that the correct value of Authentication 1 is %&su is stored in.

Turning back to FIG. 3, the application server 100 realizes functions of an application transmission unit 40, a context acquisition unit 42, a table creation unit 44, and an information transmission unit 46 by executing a program by the CPU 190.

The application transmission unit 40 has a function of analyzing work into minimal tasks to form applications, and transmitting these applications and IDs (AppID) of the applications to the terminals 10. The applications transmitted are stored in the application storage unit 24 via the application push execution unit 12.

The context acquisition unit 42 acquires context information transmitted from the context monitor unit 16 of the terminal 10, and sends it to the table creation unit 44.

Figure 4B:
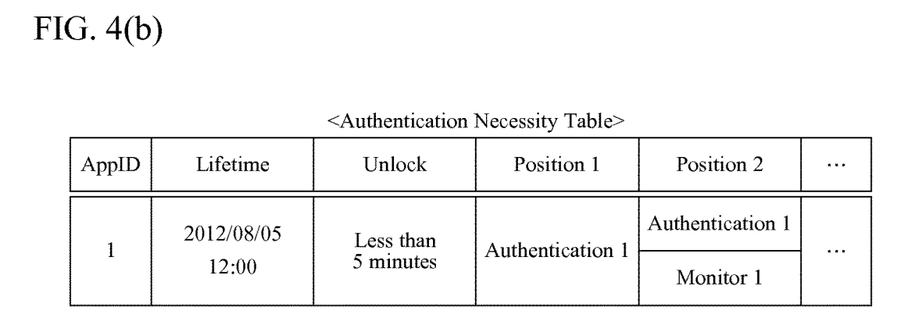

The table creation unit 44 creates an authentication necessity table on the basis of the context information received from the context acquisition unit 42. The authentication necessity table includes information about the necessity for authentication when executing the application, and includes fields of "AppID", "Lifetime", "Unlock", "Position 1", "Position 2", . . . , as illustrated in FIG. 4(*b*).

In the field "AppID", there is described ID of the application (task) that is transmitted to the terminal 10 by the application transmission unit 40.

In the field "Lifetime", there is described the deadline for processing defined for each application (task), for example, "2012/08/05 12:00". The embodiment is arranged so that the deadline for processing the application is defined by the user who registers the work with the application server 100. Thus, there is a case where the deadline for processing is not yet defined for an application.

In the field "Unlock", there is described a given period of time that is related to a case where, if user authentication (unlocking) is performed on the terminal 10 within the above given period of time, there is no need for another authentication. In FIG. 4(*b*), "less than 5 minutes" is described as an example. That is, in FIG. 4(*b*), there is defined no necessity for authentication such as Authentication 1 if user authentication (unlocking) is performed on the terminal 10 within 5 minutes.

Figure 5:
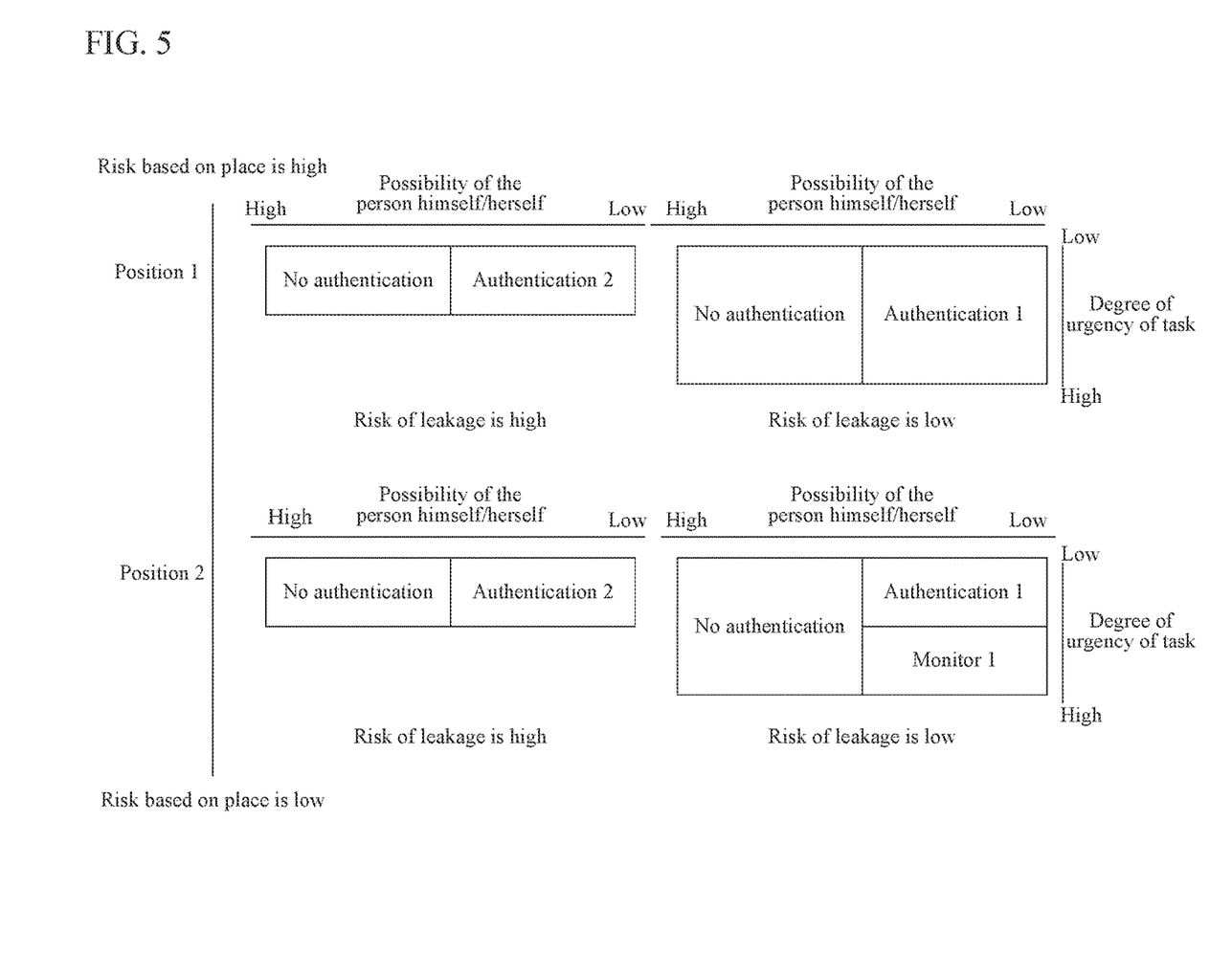
FIG. 5 is a diagram indicating a table creation rule.

In the fields of "Position 1" and "Position 2", described are types of necessary authentication on the basis of a table creation rule illustrated in FIG. 5. FIG. 5 illustrates an example of the table creation rule used when the table creation unit 44 creates the authentication necessity table. In the present embodiment, the table creation rules are designed to be prepared for the respective applications. The table creation rule in FIG. 5 is designed to determine the necessity for authentication for each position of the terminal 10 on the basis of the magnitude of risk based on the place, the magnitude of risk of leakage and the magnitude of possibility of the person himself/herself. Position 1 out of "Position 1" and "Position 2" is defined as a position having high risk (for example, outside of the company), and Position 2 is defined as a position having low risk (for example, inside the company). The embodiment is arranged so that Positions 1 and 2 (for example, the location of the company) are set beforehand by the user or the like.

In FIG. 4(*b*), there is illustrated an authentication necessity table for a case where the possibility of the person himself/herself is low and the risk of leakage is low. In the field "Position 2" in FIG. 4(*b*), although "Authentication 1" and "Monitor 1" are described, these are selectively used on the basis of the degree of urgency of the application (task) (whether the deadline for processing (Lifetime) comes closer).

Turning back to FIG. 3, the information transmission unit 46 transmits, to the key management unit 18 of the terminal 10 AppID, the authentication necessity table created by the table creation unit 44, the authentication module for executing the authentication described in the authentication necessity table, the monitor module for executing the monitoring described in the authentication necessity table, and the keys (Key).

Turning back to FIG. 1, the imaging device 70 is an imaging device, which is, for example, a security camera installed in the company or in downtown or the like. The imaging device 70 takes an image at a timing at which the monitor module is executed in the terminal 10, and makes the image stored, as a log file, in the HDD 196 of the application server 100 or the like. At the timing at which the log file is created, the application server 100 notifies the terminal 10 (key management unit 18) which executes the monitor module that the creation of the log file has been created. When the monitor module is being executed in the terminal 10, it is said that a log mode in which a log is acquired with the imaging device 70 is being executed.

Next, a detailed description is given of processing in the application server 100 and the terminals 10.

(Processing in the Application Server 100)

Figure 6:
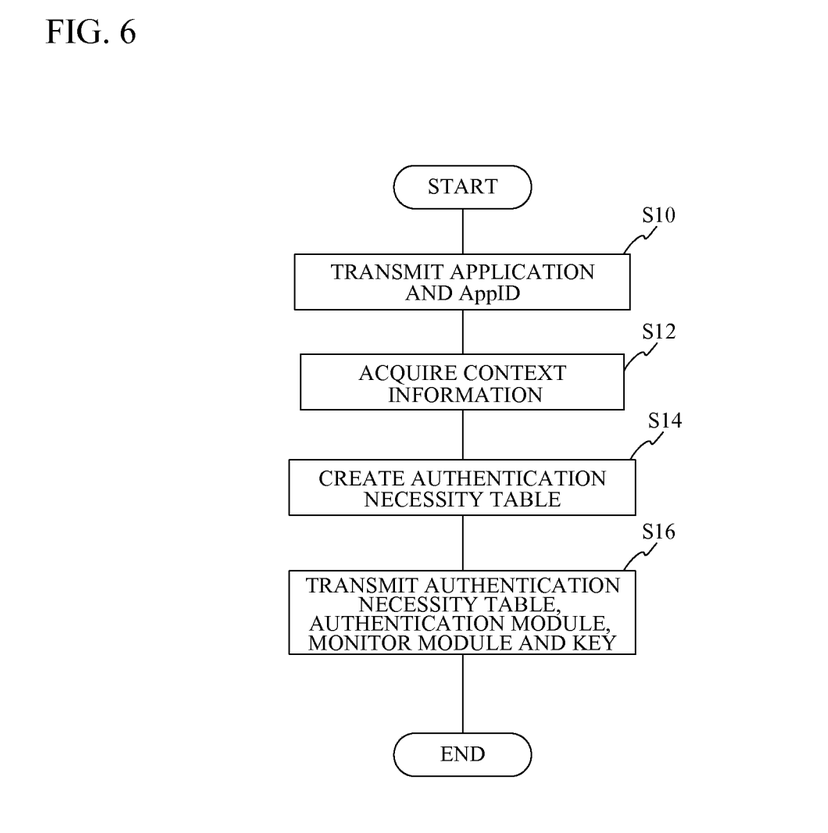
FIG. 6 is a flowchart of a process performed in the application server.

A description is now given of processing in the application server 100 with reference to a flowchart of FIG. 6.

In a process in FIG. 6, in step S10, the application transmission unit 40 transmits the application and AppID to the terminal 10. In the present embodiment, it is assumed that AppID=1. The application transmission unit 40 performs the process of step S10 at a stage in which a certain task (such as a task relating to authentication) is registered on the application server 100 by the user, for example.

Next, in step S12, the context acquisition unit 42 acquires the context information of the terminal 10 from the context monitor unit 16. Also, the context acquisition unit 42 sends the acquired context information to the table creation unit 44.

Then, in step S14, the table creation unit 44 creates the authentication necessity table illustrated in FIG. 4(b) on the basis of the context information and the table creation rule in FIG. 5. The table creation unit 44 is designed to include, in the authentication necessity table, the necessity for authentication in a position to which the terminal 10 may move (for example, Position 2) in addition to the necessity for authentication in the current position of the terminal 10 (for example, Position 1).

Then, in step S16, the information transmission unit 46 transmits, to the key management unit 18 AppID, the authentication necessity table, the Authentication-1 module and the Monitor-1 module described in the authentication necessity table, the respective keys of the modules, and the key for the application of AppID=1. The key management unit 18 transmits the received Authentication-1 module and the received Monitor-1 module to the application/module management unit 14. The application/module management unit 14 causes the received Authentication-1 module to be stored in the authentication module storage unit 22, and causes the received Monitor-1 module to be stored in the monitor module storage unit 20. As described above, the process of FIG. 6 is ended.

At the stage of the completion of the process of FIG. 6, the application of AppID=1 is stored in the application storage unit 24 in FIG. 3. Also, the Monitor-1 module is stored in the monitor module storage unit 20, and the Authentication-1 module is stored in the authentication module storage unit 22. The key management unit 18 stores the key for the received application, the respective keys for the modules, and the authentication necessity table. The information transmission unit 46 may be configured not to transmit the modules that the application/module management unit 14 already holds in the storage units 20 and 22.

(Processing in Terminal 10)

Figure 7:
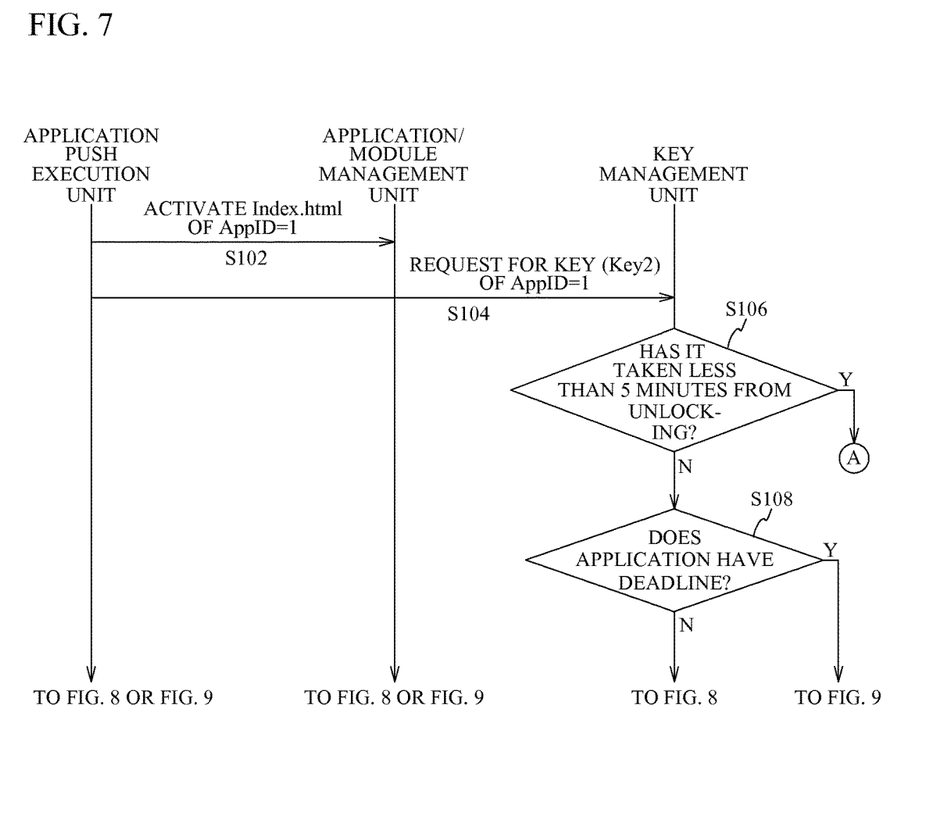
FIG. 7 is a diagram (part 1) of a process performed in the terminal.
Figure 8:
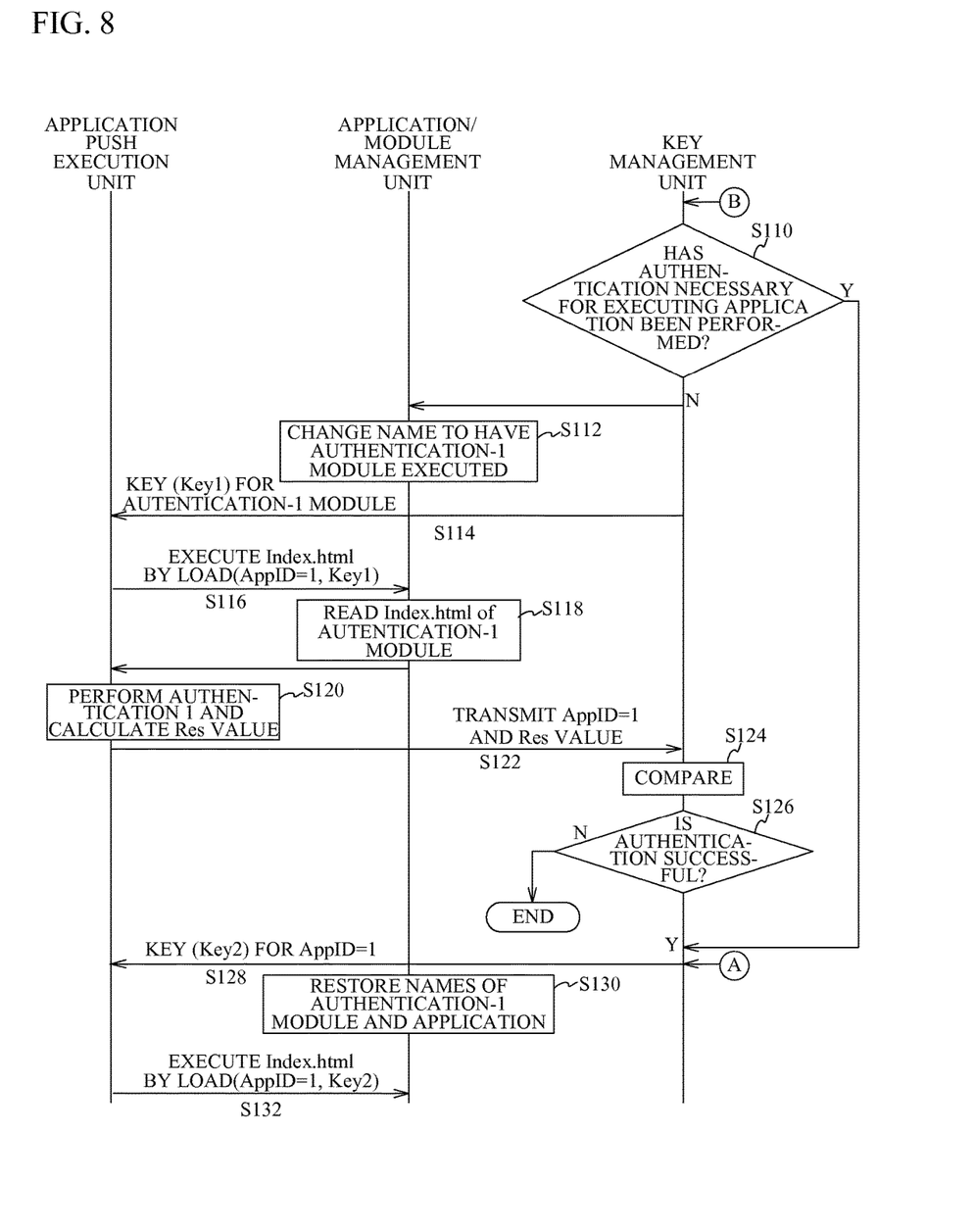
FIG. 8 is a diagram (part 2) of a process performed in the terminal.
Figure 9:
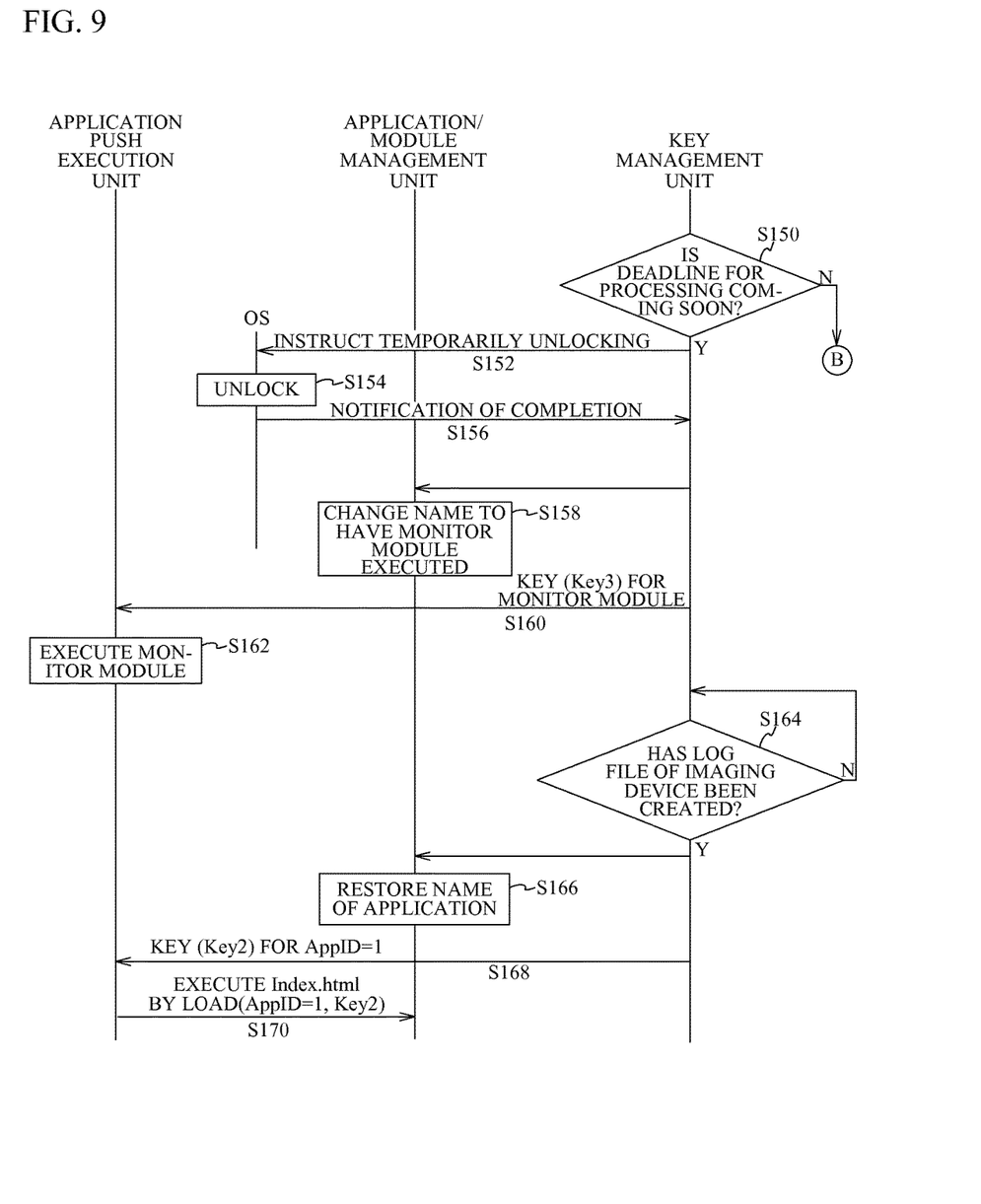
FIG. 9 is a diagram (part 3) of a process performed in the terminal.

Now, a description is given, with reference to FIGS. 7 through 9, of processing in the terminal 10 that is executed after execution of the process of FIG. 6 (the necessary authentication is performed and the application delivered from the application server 100 is executed).

FIGS. 7 through 9 illustrate processes performed in the terminal 10 (the application push execution unit 12, the application/module management unit 14 and the key management unit 18). In FIGS. 7 through 9, the processes based on the authentication necessity table of FIG. 4(b) are depicted. The processes in FIGS. 7 through 9 are on the assumption that the key management unit 18 is notified of the context information of the terminal 10 by the context monitor unit 16.

In the process in FIG. 7, in step S102, the application push execution unit 12 activates Index.html of the application of AppID=1. Next, in step S104, the application push execution unit 12 requests the key (assumed as Key2) for the application of AppID=1 for the key management unit 18.

Then, in step S106, the key management unit 18 determines whether it has taken less than 5 minutes from the last unlocking of the terminal 10. If a negative determination is made here, that is, if it has not less than 5 minutes from the last unlocking, the processing moves to step S108. A process related to a case where it has not yet taken 5 minutes from the last unlocking (a case where an affirmative determination is made in step S106) will be described later.

When the processing moves to step S108, the key management unit 18 determines whether the application of AppID=1 has a time limit, that is, whether the fixed term is described in the field of Lifetime in the authentication necessity table of FIG. 4(b). If a negative determination is made here, the processing shifts to the process of FIG. 8. In contrast, if an affirmative determination is made in step S108, the processing shifts to the process of FIG. 9.

If the processing moves to the process of FIG. 8 (if the application does not have a time limit), the key management unit 18 determines, in step S110, whether the authentication necessary for executing the application has been already performed. Especially, the key management unit 18 confirms the necessary authentication on the authentication necessity table on the basis of the context information notified from the context monitor unit 16, and confirms whether the necessary authentication has been performed by referring to "status" of the authentication table 26. For example, in the examples in FIGS. 4(a) and 4(b), it is assumed that the context information is "Position 1 (outside of the company)". In this case, a negative determination is made in step S110 because "Authentication 1" is needed in the authentication necessity table of FIG. 4(b) and the "status" of Authentication 1 in the authentication necessity table of FIG. 4(b) is "-(not yet authenticated). Alternatively, if the context information is "Position 2 (within the company)", "Authentication 1" having a low degree of urgency is also needed, and a negative determination is made in step S110 because the "status" of Authentication 1 in the authentication table of FIG. 4(a) is "-(not yet authenticated)".

If the negative determination is made in step S110, in step S112, the switch unit 30 of the application/module management unit 14 changes the name (read destination) of the Authentication-1 module in order to cause the Authentication-1 module to be executed under the key management unit 18 (redirection). In this case, in order to cause the Authentication-1 module to be executed instead of the application of AppID=1, the read destination is changed to the Authentication-1 module. In this case, in order to prevent the application of AppID=1 to be executed at the same time when the Authentication-1 module is executed, it is necessary to change the name of the Authentication-1 module and to change the name of the application to another name.

Next, in step S114, the key management unit 18 transmits the key for the Authentication-1 module (described as Key1) to the application push execution unit 12. Then, in step S116, the application push execution unit 12 executes Index.html while using AppID=1 and Key1 (that is, Load(AppID=1, Key1)).

Then, in step S118, the switch unit 30 of the application/module management unit 14 reads out Indx.html of the Authentication-1 module. Then, in step S120, the application push execution unit 12 performs Authentication 1 (challenge/response authentication) by using the Authentication-1 module, and calculates Res value by using the password input by the user or the like. Then, in step S122, the application push execution unit 12 transmits AppID=1 and the Res value to the key management unit 18.

The key management unit 18 compares the Res value and the correct value in the authentication table in step S124. Then, in step S126, if the authentication is successful by the comparison, the key management unit 18 moves to step S128. If the authentication is not successful, all processing in the terminal 10 is configured to be ended. Processing that is to be performed if the authentication fails is not limited to the above but may be configured to repeatedly perform the authentication a predetermined number of times.

The key management unit 18 moves to step S128 and transmits the key for AppID=1 (Key2) to the application push execution unit 12. Then, in step S130, the switch unit 30 of the application/module management unit 14 restores the names of the Application-1 module and the application to the original names. Then, in step S132, the application push execution unit 12 executes Index.html with AppID=1 and Key2 (that is, Load(AppID=1, Key2)), the application of AppID=1 is executed.

If an affirmative determination is made in step S110, the key management unit 18 moves directly to step S128. That is, if the authentication necessary for execution of the application (here Authentication 1) has been already performed, the terminal 10 is configured to be capable of executing the application without authentication.

As described above, by performing the process of FIG. 8, it is possible to execute the application without authentication if the authentication necessary for execution of the application has been performed. This makes it possible to omit authentication more than necessary and improve the efficiency of authentication. The switch unit 30 changes the names (read destinations) of the application and the Authentication-1 module to cause the application push execution unit 12 to automatically execute the Authentication-1 module. It is thus possible for the application push execution unit 12 to execute the Authentication-1 module without preventing the regular execution of applications.

If an affirmative determination is made in step S106 in FIG. 7, that is, if it has taken less than 5 minutes from the user authentication (unlocking) for the terminal 10, the processing moves to step S128 in FIG. 8. Then, the process of steps S128 through S132 are executed as described above (the application is executed without authentication). In this manner, the application can be executed without authentication if it has taken less than 5 minutes from the user authentication and there is a high possibility that the person who is operating the terminal 10 is the person himself/herself, so that the user convenience can be enhanced.

If an affirmative determination is made in step S108 in FIG. 7 (if the application has the deadline), the processing shifts to that of FIG. 9, and the key management unit 18 determines in step S150 whether the deadline for processing the application of AppID=1 is coming soon (whether the application (task) has a high degree of urgency). The reference for determining whether the deadline is coming soon is defined by the user or the like. If it is determined that the terminal 10 is in Position 1 in step S150, Authentication 1 is needed regardless of the degree of urgency. As described, if the authentication method does not relate to the degree of urgency, the determination made in step S150 may be made negative unconditionally.

If a negative determination is made in step S150, the processing moves to step S110 in FIG. 8, and the process (S110-S132) as described previously is performed. In contrast, if an affirmative determination is made in step S150, that is, if the deadline for processing is coming soon (the case where the application (task) has a high degree of urgency), in step S152, the key management unit 18 instructs OS (Operating System) of the terminal 10 to temporarily perform unlocking. As OS, Android (registered trademark) may be adopted. However, OS is not limited to the above but an OS other than Android (registered trademark) may be adopted.

Then, OS performs unlocking in step S154, and sends a notification of completion of unlocking to the key management unit 18 in next step S156.

Then, in step S158, the switch unit 30 of the application/module management unit 14 changes the name (read destination) of the Monitor-1 module to the read destination of the application in order to have the Monitor-1 module executed under the control of the key management unit 18. In this case, in order to prevent the application of AppID=1 from being executed at the same time when the Monitor-1 module is executed, it is necessary to change the name (read destination) of the Monitor-1 module and additionally change the name (read destination) of the application to another name. The Monitor-1 module is a module that executes a mode (log mode) for acquiring a log by taking an image of the operator who is operating the terminal 10 by using the imaging device 70.

Then, in step S160, the key management unit 18 sends the key (assumed as Key3) for the Monitor-1 module to the application push execution unit 12. Then, in step S162, the application push execution unit 12 executes Index.html with AppID=1 and Key3 (that is, Load(AppID=1, Key3)). In this case, the switch unit 30 of the application/module management unit 14 reads out Indx.html of the Monitor-1 module.

Then, in step S164, the key management unit 18 waits until the log file of the imaging device 70 is created (until the key management unit 18 is notified from the application server 100 that the log file has been created). At the stage in which the log file has been created, the switch unit 30 of the application/module management unit 14 restores the names of the Monitor-1 module and the application to the original names under the control of the key management unit 18 in step S166.

Then, in step S168, the key management unit 18 sends the key (Key2) for AppID=1 to the application push execution unit 12. Then, in next step S170, the application push execution unit 12 executes Index.html with AppID=1 and Key2 (that is, Load(AppID=1, Key2)), and the application of AppID=1 is thus executed.

As described above, according to the present embodiment, the terminal 10 executes the process of FIG. 9, whereby if the deadline for processing the application is coming soon (the case where the degree of urgency is high), the application can be executed without authentication under imaging by the imaging device 70. It is thus possible to urgently execute the application when the deadline for processing is coming soon and the degree of urgency is high and ensure the security without authentication by imaging by the imaging device 70 (for example, captured images can be confirmed later even when a person other than the user who owns the terminal 10 operates the terminal 10).

In the process of FIGS. 7 through 9 is executed each time an application is sent to the terminal 10 from the application server 100. If there is no monitor module corresponding to the position of the terminal 10 in the authentication table of FIG. 4(b), it may be configured so that the determination in step S150 in FIG. 9 is always made negative.

As described above, according to the present embodiment, the application server 100 acquires context information that indicates the status of the terminal 10 from the terminal 10 (S12), creates information (authentication necessity table) relating to the necessity for authentication for executing an application (S14), and transmitting the authentication necessity table and an authentication mode described in the table (S16). Then, the terminal 10 determines, on the basis of the authentication necessity table and the authentication table 26, whether the authentication is needed before executing the application (S110), changes the read destination of the authentication module to the read destination of the application prior to execution of the application if it is determined that the authentication is needed (S112), and executes the authentication module (S116-S120). It is thus possible to have the user of the terminal 10 execute only the necessary authentication (not yet performed) out of the authentications for executing the applications. Thus, even if the personally owned terminal 10 is used in the field of BYOD in which the security is important, it is possible to suppress deterioration of the usability of the terminal 10 caused by authenticating. Further, the embodiment changes the read destination of the authentication module to the read destination of the application to cause the application push execution unit 12 to automatically execute the authentication module, whereby the authentication module can be executed without preventing the regular execution of applications.

In the present embodiment, in the authentication necessity table, there is described the necessity for executing the monitor mode in which the log is acquired by taking an image of the operator of the terminal 10 by the imaging device 70, and the application/module management unit 14 causes the application push execution unit 12 to execute the monitor module on the basis of the authentication necessity table. It is thus possible to urgently execute the application on the terminal 10 and to ensure the security by imaging by the imaging device 70 without authentication.

In the present embodiment, as illustrated in FIG. 4(*b*), since the authentication necessity table is created for each application (each AppID), the necessity for authentication can be determined on the basis of the level of importance. Since this makes it possible to realize the setting of the authentication level depending on the application, the user is not needed to raise the security level of the whole terminal 10 personally owned (for example, increasing the number of characters of PIN). This makes it possible for the user to be free to manage the terminal 10.

If the position of the terminal 10 changes while the application is being executed, a notification of change is transmitted to the key management unit 18 from the context monitor unit 16. In this case, the key management unit 18 confirms the authentication necessity table (FIG. 4(*b*)) and the authentication table (FIG. 4(*a*)) on the basis of the notification of change, and checks if there is any authentication module that is to be executed. If there is an authentication module that is to be executed, the execution of the application is interrupted, and the present authentication module is executed. Thus, even if the user moves and the position of the terminal 10 changes, the appropriate authentication depending on the position can be executed at an appropriate timing. The reason why the necessity for authentication that depends on a change of the position of the terminal 10 can be determined is that the table creation unit 44 is configured to include, in the authentication necessity table, the necessity for authentication in the position (for example, Position 2) to which the terminal 10 may move other than the necessity for authentication in the position (for example, Position 1) included in the context information of the terminal 10 (step S14).

If information included in the context information other than the position is changed (for example, if the possibility of the person himself/herself or the risk of leakage changes), the authentication necessity table may be recreated. If the authentication necessity table is recreated to include a different authentication module and a different monitor module in the authentication necessity table, the information transmission unit 46 may transmit the module newly included in the authentication necessity table and the key for this module to the key management unit 18.

In the above embodiment, the authentication necessity table capable of handling a change of the position of the terminal 10 is created. However, the present embodiment is not limited to the above. For example, an authentication necessity table may be created that corresponds to only context information (position) acquired when the authentication necessity table is created.

Although a particular reference is not made in the above embodiment, the application push execution unit 12 may be configured to control the imaging device 70 in order to follow the user that owns the terminal 10 with the imaging device 70. In this case, for example, ID of the terminal 10 is output at fixed intervals from an infrared emission unit mounted in the terminal 10, and the application push execution unit 12 may follow the user who owns the terminal 10 on the basis of the results of light receiving (the result of acquisition of ID) by an infrared receiving unit capable of receiving infrared rays and owned by the imaging device 70.

The format of display of applications on the display unit 93 of the terminal 10 may be changed by using an AR (Augmented Reality) technique or the like in order to always have the user face toward the imaging device 70. In this case, for example, the display function of the application may be changed so that the size and direction of the application are appropriately displayed only during the time when the user is facing toward the imaging device 70.

When the button of "report of theft/loss of terminal 10" is pushed, it may be configured to acquire the log of the position of the terminal 10 and start to take an image by a camera mounted in the terminal 10 and creating the log file. After that, if the user authentication is performed on the terminal 10 and it is confirmed that the terminal 10 is held by the true user, the log file of the application server 100 may be deleted.

The above processing function may be realized by a computer. In this case, a program that describes the content of processing of the functions that should be implemented in the processing device is provided. When the program runs on the computer, the processing functions are realized on the computer. The program that describes the content of processing may be recorded on a computer readable recording medium (except for carrier wave).

When the program is placed in market, the program is sold in the form of a portable recording medium such as DVD (digital Versatile Disc) and CD-ROM (Compact Disc Read Only Memory) on which the program is recorded. It is also possible to store the program in a storage device of a server computer and transmit the program to another computer from the server computer via a network.

The computer that executes the program stores, in its own storage device, the program recorded on the portable storage medium or the program transmitted from the server computer. Then, the computer reads the program from its own storage device and performs the process described in the program. The computer may read the program directly from the portable storage medium and performs the process described in the program. Also, each time a program is transmitted to the computer from the server, the computer may sequentially perform the process described in the program.

The above-described embodiments are preferred embodiments of the present invention. However, the present invention is not limited to these embodiments but various variations may be made without departing from the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An authentication method comprising:
a step in which a server transmits an application necessary for a user to execute a task that is to be executed by the user at a minimum to a terminal device of the user via a network to which the server and the terminal device are connected;
a step in which the server acquires context information that indicates status of the terminal device from the terminal device;
a step in which the server generates information about necessity for authentication that describes necessary authentication to be executed when the application is executed in the terminal device with respect to the context information acquired and a condition that allows no authentication to be performed on the basis of the context information acquired;
a step in which the server transmits the information about the necessity for authentication and an authentication module for executing the necessary authentication;
a step in which the terminal device determines, before executing the application, whether the necessary authentication is needed on the basis of the information about the necessity for authentication and history information about authentication performed in the past;
a step in which the terminal device executes the application when the terminal device determines that the necessary authentication is not needed, and the terminal device changes, before executing the application, a name of the authentication module for executing the necessary authentication to a name of the application and changes the name of the application to another name to execute the authentication module instead of the application when the terminal device determines that the necessary authentication is needed.

2. The authentication method according to claim 1, wherein the information about the necessity for authentication includes information about whether a log mode for acquiring a log by taking an image of an operator who operates the terminal device by an imaging device should be performed, and
the step of executing the authentication module executes a monitor module capable of executing the log mode as the authentication module.

3. The authentication method according to claim 1, wherein in the step of generating, the server generates information about the necessity for authentication corresponding to the context information acquired and information about the necessity for authentication for context information different from the context information acquired, and
in the step of executing the authentication module, the terminal device determines whether the authentication is needed on the basis of the context information of the terminal device before executing the application.

4. The authentication method according to claim 1, wherein the information about the necessity for authentication is generated for each application.

5. The authentication method according to claim 1, wherein the information about the necessity for authentication includes information about whether a log mode for acquiring a log by taking an image of an operator who operates the terminal device by an imaging device should be performed, and
the step of executing the authentication module executes a monitor module capable of executing the log mode as the authentication module to allow the application to be executed without authentication under imaging by the imaging device.

6. A non-transitory computer-readable recording medium having stored therein a program for causing a computer to execute a process comprising:
providing a server with context information of a terminal device, the context information indicating status of the terminal device;
receiving an application necessary for a user to execute a task that is to be executed by the user at a minimum from the server via a network to which the server and the terminal device are connected;
acquiring, from the server, information about a necessity for authentication and an authentication module, the information about a necessity for authentication describing necessary authentication to be executed when the application is executed in the terminal device with respect to the context information and a condition that allows no authentication to be performed, the information about a necessity for authentication being generated by the server generated on the basis of the context information, and the authentication module being for executing the necessary authentication;
determining whether the necessary authentication is needed before executing the application on the basis of the information about the necessity for authentication and history information about authentication performed in the past;
executing the application when determining that the necessary authentication is not needed;
changing, before executing the application, a name of the authentication module for executing the necessary authentication to a name of the application, and changing the name of the application to another name to execute the authentication module instead of the application when determining that the necessary authentication is needed.

7. The non-transitory computer-readable recording medium according to claim 6, wherein the information about the necessity for authentication includes information about whether a log mode for acquiring a log by taking an image of an operator who operates the terminal device by an imaging device, and
the executing of the authentication module executes a monitor module capable of executing the log mode as the authentication module.

8. The non-transitory computer-readable recording medium according to claim 6, wherein the information about the necessity for authentication includes information about the necessity for authentication corresponding to context information provided to the server in the providing and information about the necessity for authentication for context information different from the context information acquired, and
the executing of the authentication module determines whether the authentication is needed on the basis of the context information of the terminal device before executing the application.

9. The non-transitory computer-readable recording medium according to claim 6, wherein the information about the necessity for authentication is generated for each application.

10. The non-transitory computer-readable recording medium according to claim 6, wherein the information about the necessity for authentication includes information about whether a log mode for acquiring a log by taking an image of an operator who operates the terminal device by an imaging device should be performed, and     the executing of the authentication module executes a monitor module capable of executing the log mode as the authentication module to allow the application to be executed without authentication under imaging by the imaging device.

\* \* \* \* \*